United States Patent
Moore et al.

[19]

[11] Patent Number: 5,816,064
[45] Date of Patent: Oct. 6, 1998

[54] MODULAR AIR CONDITIONING ASSEMBLY FOR A MOTOR VEHICLE

[75] Inventors: Thomas S. Moore, Northville; Delbert D. DeRees, Romeo; Douglas W. Killian, Fenton, all of Mich.

[73] Assignee: Chrysler Corporation, Auburn Hills, Mich.

[21] Appl. No.: 812,814

[22] Filed: Mar. 6, 1997

Related U.S. Application Data

[60] Provisional application No. 60/017,675 May 16, 1996.
[51] Int. Cl.$^6$ .................................................. B60H 1/32
[52] U.S. Cl. .............................................................. 62/244
[58] Field of Search ................................. 62/244, 323.1

[56] References Cited

U.S. PATENT DOCUMENTS

| | | | |
|---|---|---|---|
| 2,263,476 | 11/1941 | Sunday | 62/323.1 |
| 2,475,841 | 7/1949 | Jones | 62/323.1 |
| 2,480,510 | 8/1949 | Roper | 62/323.1 |
| 2,862,652 | 12/1958 | Hoiby et al. | 62/323.1 |
| 3,606,762 | 9/1971 | Anglin et al. | 62/244 |
| 4,022,599 | 5/1977 | Wilson et al. | 62/244 |
| 4,217,764 | 8/1980 | Armbruster | 62/323.1 |
| 4,811,569 | 3/1989 | Welch et al. | 52/323.1 |

*Primary Examiner*—William E. Tapolcai

[57] ABSTRACT

An air conditioning unit for a motor vehicle is housed entirely inside a passenger compartment of a motor vehicle. The air conditioning unit includes a power generator inside an enclosure which also houses the air conditioning unit. The power generator is a small internal combustion engine that combusts the same fuel as the primary internal combustion engine which provides the motive force for the motor vehicle. The enclosure has an inlet port which allows ambient air to flow into the enclosure and an outlet port which allows the ambient air to exit the enclosure and the motor vehicle after it has been heated. The thermal energy received by the ambient air is transmitted from the internal air inside the passenger compartment and transferred to the ambient air via a fluid (refrigerant) which flows therebetween. The use of the power generator eliminates a drain of power on the primary internal combustion engine when the air conditioning unit is being used.

12 Claims, 2 Drawing Sheets

5,816,064

MODULAR AIR CONDITIONING ASSEMBLY FOR A MOTOR VEHICLE

BACKGROUND OF THE INVENTION

This application is a United States Patent Application based on U.S. Provisional patent application Ser. No. 60/017,675, filed May 16, 1996, priority to which is claimed.

1. Field of the Invention

The invention relates to an air conditioning assembly for a motor vehicle. More particularly, the invention relates to an air conditioning assembly for a motor vehicle having an independent power generator.

2. Description of Related Art

As new markets for motor vehicles continue to open, a need for low-cost motor vehicles grows. To help reduce the cost of the motor vehicle, the requirements of the internal combustion engine are reduced. A simplified internal combustion engine is lighter, requiring less supporting structure, further reducing the cost of the motor vehicle. The cost of the simplified internal combustion engine also reduces the overall cost of the motor vehicle.

A disadvantage associated with a simplified, light weight, lower cost internal combustion engine is loss of power. The power output levels of such internal combustion engines are typically less than a third of power output levels of internal combustion engines typically found in motor vehicles. Although the output levels of the simplified internal combustion engine are adequate to operate a light-weight motor vehicle, it is difficult to operate the motor vehicle in an optimal fashion when accessories are also consuming power generated by the same simplified internal combustion engine. An accessory that requires a substantial amount of energy is an air conditioner for the air in a passenger compartment of the motor vehicle. An air conditioner consumes so much power that it may have to be turned off in situations when demand on the performance of the motor vehicle require more output by the simplified internal combustion engine than it is capable of dedicating to the motor vehicle when a portion of its output is consumed by the air conditioner. Therefore, there is a need in the art to develop an air conditioning unit which does not depend on power generated by an internal combustion engine used to power a motor vehicle.

SUMMARY OF THE INVENTION

An air conditioning assembly used for cooling air in a passenger compartment of a motor vehicle is disclosed. The motor vehicle includes at least two seats in the passenger compartment and a fuel supply outside of the passenger compartment. The air conditioning assembly includes an enclosure having an inlet port and an outlet port allowing ambient air to flow therethrough. A fluid flow path extends through a portion of the enclosure allowing fluid to flow therethrough such that the air inside the passenger compartment is cooled. A power generator is housed within the enclosure. The power generator energy into mechanical energy to force the fluid to flow through the fluid flow path.

One advantage associated with the invention is the ability to cool air in a passenger compartment of a motor vehicle. Another advantage associated with the invention is the ability to cool air in the passenger compartment of the motor vehicle without reducing the performance of the motor vehicle. Yet another advantage associated with the invention is the ability to cool air in the passenger compartment of the motor vehicle regardless of the output level of the internal combustion engine of the motor vehicle. More specifically, the air in the passenger compartment may be cooled even when the internal combustion engine of the motor vehicle is at a low output due to traffic conditions or even when it is "off." Yet another advantage associated with the invention is to provide an air conditioning assembly which is modular reducing costs associated with the manufacture of the motor vehicle.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
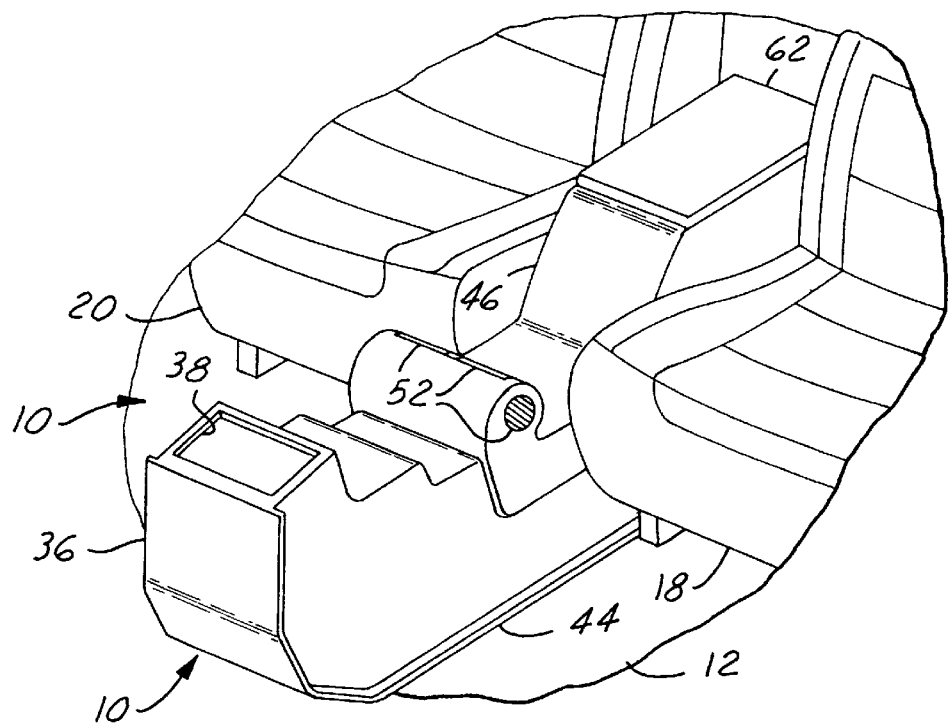
FIG. 1 is a partially cut away perspective view of one embodiment of the invention.
Figure 2:
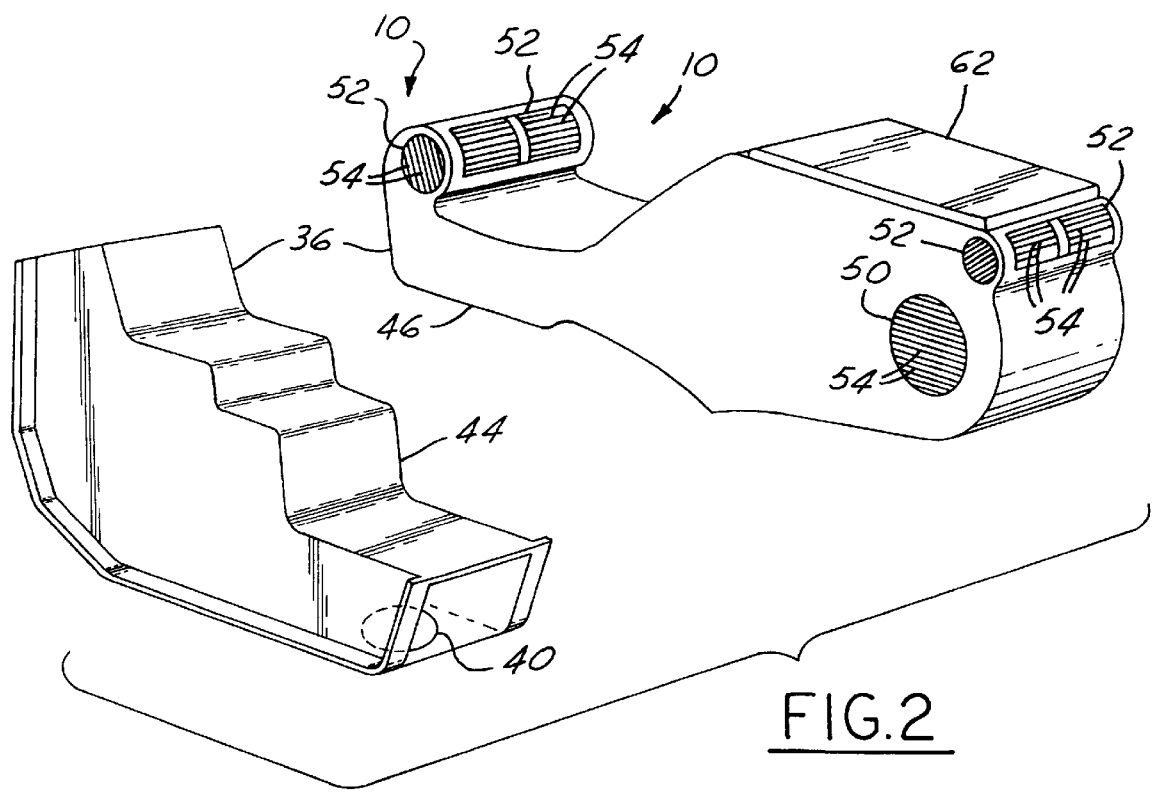
FIG. 2 is an exploded view of one embodiment of the invention.

Referring to FIG. 1, an air conditioning assembly is generally indicated at 10. The air conditioning assembly 10 cools air found in a passenger compartment 12 of a motor vehicle 14, partially shown in FIG. 3. The motor vehicle 14 includes a primary internal combustion engine (not shown), a fuel supply tank 16 (FIG. 3), both of which are located outside the passenger compartment 12. The motor vehicle 14 also includes at least two seats 18, 20 separated by the air conditioning assembly 10.

Figure 3:
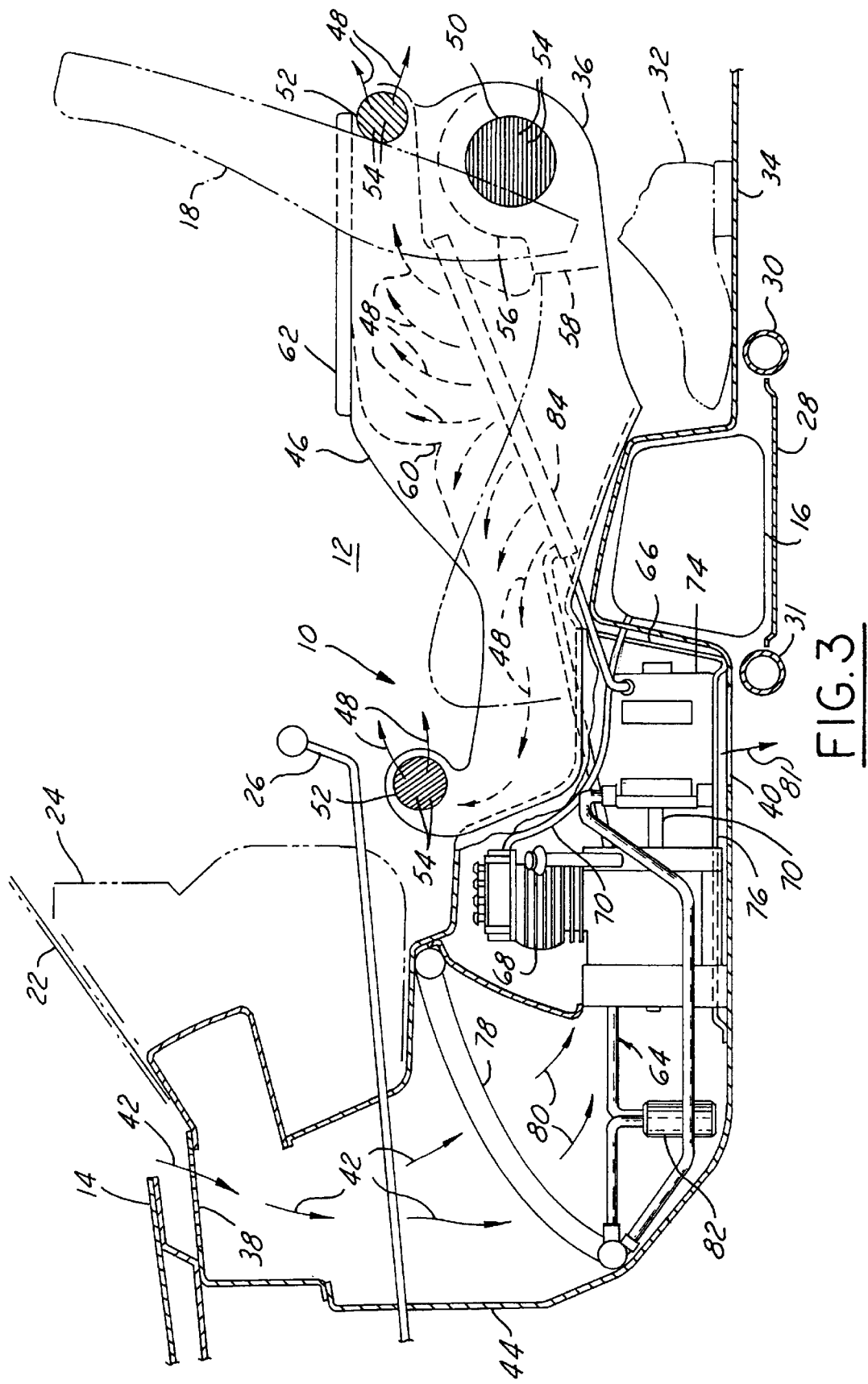
FIG. 3 is a cross-sectional side view of one embodiment of the invention installed in a passenger compartment of a motor vehicle.

Referring to FIG. 3, the motor vehicle 14 includes a windshield 22, partially cut away, an instrument panel 24 and a cane shifter 26. The fuel supply tank 16 includes a protective structure or shield 28 which is part of a frame 30 for the motor vehicle 14. Although not shown in FIG. 3, the frame 30 supports the passenger compartment 12, the primary internal combustion engine (not shown) and the rest of the motor vehicle 14. A shoe 32, shown in phantom, represents the option for the motor vehicle 14 having a back seat allowing passengers to sit behind the driver seat 18. A vehicle floor 34 extends over and between the passenger compartment 12 and the fuel supply tank 16 and the frame 30.

The air conditioning assembly 10 includes an enclosure 36. The enclosure 36 includes an inlet port 38 and an outlet port 40. Ambient air, as represented by arrows 42, is allowed to flow through the enclosure 36 by entering the inlet port 38 and exiting the outlet port 40. The ambient air 42 does not enter the passenger compartment 12 of the motor vehicle 14. This is because the ambient air 42 is heated as it passes through the enclosure 36. In this embodiment, the enclosure 36 includes a first compartment 44 within the motor vehicle 14 and a second compartment 46. The ambient air 42 passes through the first compartment 44 of the enclosure 36. Interior air 48, air found in the passenger compartment 12, circulates through the passenger compartment 12 and the second compartment 46. The interior air 48 does not pass through the first compartment 44 of the enclosure 36. The interior air 48 passes from an interior blower port 50 through a plurality of exterior ports 52 allowing the interior air 48 to reenter the passenger compartment 12. The interior blower port 50 and the plurality of exterior ports 52 all include air directional devices 54 known to those skilled in the art. A blower motor 56 rotates a fan (not shown) forcing the interior air 48 into the interior blower port 50 and out through the blower outlet port 58 within the enclosure 36. This air is forced through the plurality of exterior ports 52. A directional fin 60 is used to direct the interior air 48 to each of the plurality of exterior ports 52. A pad 62 is secured to the top of the second compartment 46 of the enclosure 36 to form an arm rest.

The air conditioning assembly 10 includes a fluid flow path, generally indicated at 64 in FIG. 3. The fluid flow path 64 extends through the first compartment 44 and the second compartment 46. Appropriate sealing devices (not shown) prevent air flow between the first 44 and second 46 compartments by surrounding the fluid flow path 64 at the interface 66 between the first 44 and second 46 compartments. The fluid flow path 64 allows a fluid (not shown) to flow therethrough in order to cool the interior air 48 of the passenger compartment 12.

The fluid flow path 64 includes a power generator 68 housed within the enclosure 36. The power generator 68 converts energy into mechanical energy to force the fluid to flow through the fluid flow path 64. The power generator 68 is a secondary internal combustion engine capable of converting fuel stored in the fuel supply tank 16 into the mechanical energy required to generate a flow in the fluid through the fluid flow path 64. A fuel line 70 extends between the secondary internal combustion engine 68 and the fuel supply tank 16. The fuel line 70 extends through the enclosure 36 to reach the fuel supply tank 16. Therefore, the fuel stored in the fuel supply tank 16 is used and combusted by both the primary internal combustion engine (not shown) used to move and operate the motor vehicle 14 and the secondary internal combustion engine 68 used to cool the air by providing energy for the air conditioning assembly 10. The secondary internal combustion engine 68 may be a small horsepower engine (five or more horsepower).

The energy created by the secondary internal combustion engine 68 is turned into a rotational motion in an output shaft 72 which is used to rotate a rotor (not shown) in a compressor 74. The compressor 74 and the secondary internal combustion engine 68 are secured to the enclosure 36 through a mounting support 76. The compressor 74 forces fluid out toward the front of the enclosure 36 to be received by a condenser 78. The condenser 78 condenses the fluid as it is passing through the fluid flow path 64 by transferring the heat from the fluid to the ambient air 42 as it passes therethrough. The warm air, represented by arrows 80, is the ambient air 42 which has retained the thermal energy of the fluid. The warm air 80 is passed by the secondary internal combustion engine 68 to cool it. By transferring the thermal energy from the secondary internal combustion engine 68 to the warm air 80, the warm air 80 is converted into hot air 81 where it is exited through the outlet port 40 out away from the passenger compartment 12 of the motor vehicle 14.

A filter 82 in the fluid flow path 64 receives the fluid as it leaves the condenser 78. The filter 82 dries the fluid as it passes from the first compartment 44 to the second compartment 46. In the second compartment 46, the fluid is received by an evaporator core 84. The evaporator core 84 transfers the thermal energy received from the interior air 48 and transfers the thermal energy to the fluid passing through the evaporator core 84. By transferring the thermal energy from the interior air 48 to the evaporator core 84, the interior air 48 is cooled. Once passed through the evaporator core 84, the fluid is expanded into a gaseous state. The gaseous fluid is then received by the condenser 78 and condensed into liquid form.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. An air conditioning assembly for cooling air in a passenger compartment of a motor vehicle having a fuel supply, and at least two seats in the passenger compartment, said air conditioning assembly comprising:

an enclosure having an inlet port and an outlet port allowing ambient air to flow therethrough, the enclosure being located inside the passenger compartment;

a fluid flow path extending through a portion of said enclosure allowing fluid to flow therethrough such that the passenger compartment air is cooled; and a power generator housed within said enclosure, said power generator converting energy into mechanical energy to force the fluid to flow through said fluid flow path.

2. An air conditioning assembly as set forth in claim 1 wherein said power generator is an internal combustion engine.

3. An air conditioning assembly as set forth in claim 2 including a fuel line extending from the fuel supply through said enclosure to said internal combustion engine.

4. An air conditioning assembly as set forth in claim 1 wherein said fluid flow path includes a condenser adjacent said inlet port of said enclosure.

5. An air conditioning assembly as set forth in claim 1 wherein said fluid flow path includes an evaporator core.

6. An air conditioning assembly as set forth in claim 1 wherein said fluid flow path includes a compressor.

7. An air conditioning assembly as set forth in claim 5 including a blower to force air over said evaporator core.

8. An air conditioning assembly as set forth in claim 7 wherein said enclosure includes an interior blower port disposed adjacent said blower.

9. An air conditioning assembly as set forth in claim 8 wherein said enclosure includes a plurality of exterior ports disposed adjacent said evaporator core.

10. An air conditioning assembly for cooling air in a passenger compartment of a motor vehicle having a fuel supply and at least two seats in the passenger compartment of a motor vehicle having a fuel supply and at least two seats in the passenger compartment, said air conditioning assembly comprising:

an enclosure having an inlet port and an outlet port allowing ambient air to flow therethrough, the enclosure being located inside the passenger compartment;

a fluid flow path extending through a portion of said enclosure allowing fluid to flow therethrough such that the passenger compartment air is cooled;

a power generator housed within said enclosure, said power generator converting energy into mechanical energy to force the fluid to flow through said fluid flow path; and a power generator, said power generator being an internal combustion engine.

11. An air conditioning assembly as set forth in claim 10 wherein said enclosure extends between the seats in the passenger compartment.

12. A motor vehicle comprising:

a frame;

a fuel tank secured to said frame for storing fuel therein;

an internal combustion engine secured to said frame, said internal combustion engine converting the fuel to mechanical energy to force said motor vehicle to move;

a passenger compartment including at least two seats and secured to said frame;

an air conditioning unit secured inside said passenger compartment between said seats, said air conditioning unit including an enclosure having an inlet port and an outlet port allowing ambient air to flow therethrough, said outlet port extending through said passenger compartment to allow the ambient air to flow thereout;

a fluid flow path extending through a portion of said enclosure allowing fluid to flow therethrough such that the passenger compartment air is cooled; and a power generator housed within said enclosure, said power generator converting energy into mechanical energy to force the fluid to flow through said fluid flow path.

* * * * *